United States Patent
Izumihara et al.

(10) Patent No.: US 9,715,240 B2
(45) Date of Patent: Jul. 25, 2017

(54) FACILITY EQUIPMENT OPERATION DEVICE, FACILITY EQUIPMENT OPERATION SYSTEM, FACILITY EQUIPMENT OPERATION METHOD, AND MEDIUM

(71) Applicant: Mitsubishi Electric Corporation, Tokyo (JP)

(72) Inventors: Hiroko Izumihara, Tokyo (JP); Tomoaki Gyota, Tokyo (JP); Masanori Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 270 days.

(21) Appl. No.: 14/441,610

(22) PCT Filed: Nov. 22, 2013

(86) PCT No.: PCT/JP2013/081553
§ 371 (c)(1),
(2) Date: May 8, 2015

(87) PCT Pub. No.: WO2014/084145
PCT Pub. Date: Jun. 5, 2014

(65) Prior Publication Data
US 2015/0293540 A1    Oct. 15, 2015

(30) Foreign Application Priority Data
Nov. 30, 2012    (JP) .................................. 2012-263247

(51) Int. Cl.
G06F 19/00    (2011.01)
G05D 23/19    (2006.01)
(Continued)

(52) U.S. Cl.
CPC ...... *G05D 23/1917* (2013.01); *F24F 11/0012* (2013.01); *G05B 19/042* (2013.01);
(Continued)

(58) Field of Classification Search
CPC combination set(s) only.
See application file for complete search history.

(56) References Cited

U.S. PATENT DOCUMENTS 6,965,837 B2 *  11/2005  Vintola ..................... H03F 1/52
                                                                324/600
8,091,373 B2 *   1/2012  Hugghins ............ F24F 11/0009
                                                                 62/125

(Continued)

FOREIGN PATENT DOCUMENTS

EP    1 091 178 A2    4/2001
EP    2 208 944 A1    7/2010
(Continued)

OTHER PUBLICATIONS

Sasubry et al., Fault Detection in HVAC System Using Model-Based feedforward Control, 2001, Senior Resarch Engineer Contros, Inc. pp. 403-415.*
(Continued)

*Primary Examiner* — Kidest Bahta
(74) *Attorney, Agent, or Firm* — Posz Law Group, PLC

(57) ABSTRACT

A facility equipment operation device includes an affected section determiner and a mismatch detector. An affected section determiner computes an affected section that is affected by a controlled equipment that is facility equipment with a changed control parameter, by referencing data including an installation position of facility equipment in an objective space, and a capability related to an area affected by the facility equipment. The mismatch detector detects a mismatched state on the basis of whether or not an effect exerted by the controlled equipment on the affected section when the controlled equipment operates according to the
(Continued)

changed control parameter, and an effect exerted on the affected section by a facility equipment currently operating, are in a predetermined relationship.

15 Claims, 17 Drawing Sheets

(51) Int. Cl.
  *F24F 11/00* (2006.01)
  *G05B 19/042* (2006.01)

(52) U.S. Cl.
  CPC .................. *F24F 2011/0052* (2013.01); *F24F 2011/0091* (2013.01)

(56) References Cited

U.S. PATENT DOCUMENTS

2007/0044499 A1* 3/2007 Reilly, Jr. ............... F24F 13/00
  62/298

2009/0044552 A1* 2/2009 Hugghins ............ F24F 11/0086
  62/175

FOREIGN PATENT DOCUMENTS

| JP | H05-280785 A | 10/1993 |
| JP | H06-159762 A | 6/1994 |
| JP | 2002-333197 A | 11/2002 |
| JP | 2010-145070 A | 7/2010 |
| JP | 2012-122723 A | 6/2012 |

OTHER PUBLICATIONS

International Search Report of the International Searching Authority mailed Jan. 14, 2014 for the corresponding international application No. PCT/JP2013/081553 (and English translation).

Extended European Search Report dated Nov. 28, 2016 issued in corresponding EP patent application No. 13859376.9.

* cited by examiner

| EQUIPMENT ADDRESS | EQUIPMENT TYPE | INSTAL- LATION POSITION | INSTAL- LATION DIRECTION |
|---|---|---|---|
| 1 | 4-WAY BLOW-OUT INDOOR UNIT | {1,1} | {1,0} |
| 2 | 4-WAY BLOW-OUT INDOOR UNIT | {1,3} | {1,0} |

| EQUIPMENT TYPE | CAPABILITY |
|---|---|
| 4-WAY BLOW-OUT INDOOR UNIT | {{1,0},1}{{-1,0},1}{{0,1},1}{{0,-1},1} |
| 2-WAY BLOW-OUT INDOOR UNIT | {{1,0},1}{{-1,0},1} |
| 1-WAY BLOW-OUT INDOOR UNIT | {{1,0},2} |

| SECTION | OPERATING EQUIPMENT – EFFECT |
|---|---|
| {0,0} | — |
| {0,1} | {1,COOL} |
| {0,2} | — |
| {0,3} | — |
| {0,4} | — |
| {1,0} | {1,COOL} |
| {1,1} | {1,COOL} |
| {1,2} | {1,COOL} |
| {1,3} | — |
| {1,4} | — |
| {2,0} | — |
| {2,1} | {1,COOL} |
| {2,2} | — |
| {2,3} | — |
| {2,4} | — |

| EFFECT | DETERMINATION RULE |
|---|---|
| COOL | OPERATING MODE = COOLING MODE AND SET TEMPERATURE < ROOM TEMPERATURE + 2 |
| HEAT | OPERATING MODE = HEATING MODE AND SET TEMPERATURE > ROOM TEMPERATURE − 2 |
| VENTILATE | DOES NOT CORRESPOND TO EITHER RULE |

| SECTION | OPERATING EQUIPMENT - EFFECT |
|---|---|
| {0,0} | — |
| {0,1} | {1,COOL} |
| {0,2} | — |
| {0,3} | {2,HEAT} |
| {0,4} | — |
| {1,0} | {1,COOL} |
| {1,1} | {1,COOL} |
| {1,2} | {1,COOL} {2,HEAT} |
| {1,3} | {2,HEAT} |
| {1,4} | {2,HEAT} |
| {2,0} | — |
| {2,1} | {1,COOL} |
| {2,2} | — |
| {2,3} | {2,HEAT} |
| {2,4} | — |

| SECTION | OPERATING EQUIPMENT – EFFECT |
|---|---|
| {0,0} | — |
| {0,1} | {1,COOL} |
| {0,2} | — |
| {0,3} | {2,COOL} |
| {0,4} | — |
| {1,0} | {1,COOL} |
| {1,1} | {1,COOL} |
| {1,2} | {1,COOL} {2,COOL} |
| {1,3} | {2,COOL} |
| {1,4} | {2,COOL} |
| {2,0} | — |
| {2,1} | {1,COOL} |
| {2,2} | — |
| {2,3} | {2,COOL} |
| {2,4} | — |

FIG.14

| {0,0} | {0,1} | {0,2} | {0,3} |       |
|-------|-------|-------|-------|-------|
| {1,0} | {1,1} | {1,2} | {1,3} | {1,4} |
| {2,0} | {2,1} | {2,2} | {2,3} | {2,4} |

| EQUIPMENT ADDRESS | EQUIPMENT TYPE | INSTAL-LATION POSITION | INSTAL-LATION DIRECTION |
|---|---|---|---|
| 1 | 4-WAY BLOW-OUT INDOOR UNIT | {1,1} | {1,0} |
| 2 | 4-WAY BLOW-OUT INDOOR UNIT | {0,3} | {1,0} |
| 3 | 1-WAY BLOW-OUT INDOOR UNIT | {2,2} | {-1,0} |

FIG.19

| SECTION | OPERATING EQUIPMENT – EFFECT |
|---|---|
| {0,0} | — |
| {0,1} | {1,COOL} |
| {0,2} | {2,HEAT} |
| {0,3} | {2,HEAT} |
| {0,4} | {2,HEAT} |
| {1,0} | {1,COOL} |
| {1,1} | {1,COOL} |
| {1,2} | {1,COOL} |
| {1,3} | {2,HEAT} |
| {1,4} | — |
| {2,0} | — |
| {2,1} | {1,COOL} |
| {2,2} | — |
| {2,3} | — |
| {2,4} | — |

FIG.23

| SECTION | OPERATING EQUIPMENT – EFFECT |
|---|---|
| {0,0} | — |
| {0,1} | {1,COOL} |
| {0,2} | {1,COOL} {2,HEAT} {3,VENTILATE} |
| {0,3} | {2,HEAT} |
| {0,4} | {2,HEAT} |
| {1,0} | {1,COOL} |
| {1,1} | {1,COOL} |
| {1,2} | {1,COOL} {3,VENTILATE} |
| {1,3} | {2,HEAT} |
| {1,4} | — |
| {2,0} | — |
| {2,1} | {1,COOL} |
| {2,2} | {3,VENTILATE} |
| {2,3} | — |
| {2,4} | — |

FACILITY EQUIPMENT OPERATION DEVICE, FACILITY EQUIPMENT OPERATION SYSTEM, FACILITY EQUIPMENT OPERATION METHOD, AND MEDIUM

CROSS REFERENCE TO RELATED APPLICATION

This application is a U.S. national stage application of International Patent Application No. PCT/JP2013/081553 filed on Nov. 22, 2013, which is based on and claims priority from Japanese Patent Application No. 2012-263247 filed on Nov. 30, 2012, the contents of which are incorporated herein by reference.

TECHNICAL FIELD

The present disclosure relates to a device, system, method, and computer readable medium for operating facility equipment such as an air conditioner or lighting equipment.

BACKGROUND

In a building for a store, an office or the like, a plurality of air conditioners may be installed to air-condition a wide open space without partitions or the like. In many air conditioners, control rules for autonomous control are user-configurable for each individual air conditioner, and many air conditioners are operated by a user using a remote controller.

If a user incorrectly configures a control rule, or incorrectly operates a remote controller, a plurality of air conditioners may sometimes enter a mismatched running state in which the air conditioners impede each other's effects. A mismatched running state refers to an operating state in which, among two air conditioners affecting a common space, one is performing cooling operation while the other is performing heating operation, for example.

In a mismatched operating state, mixing loss occurs and the energy efficiency is degraded. In addition, users in the space being affected by both heating and cooling operation experience decreased comfort. For this reason, various technology that minimizes the occurrence of a mismatched operating state is being proposed (for example, see Patent Literature 1 and 2).

For example, the technology described in Patent Literature 1 forbids changing the running mode of a fan coil when a running command for changing the running mode of a fan coil for a second zone that neighbors a first zone differs from the current running mode of an air conditioner for the first zone.

In addition, with the technology described in Patent Literature 2, when at least a predetermined number of individual air conditioners in a second group are running in a cooling/heating mode that is the reverse of the cooling/heating mode of individual air conditioners in a first group, the individual air conditioners in the second group shift the set temperature of individual air conditioners in the second group in the direction of the cooling/heating mode of the individual air conditioners in the first group.

PATENT LITERATURE

Patent Literature 1: Unexamined Japanese Patent Application Kokai Publication No. H6-159762
Patent Literature 2: Unexamined Japanese Patent Application Kokai Publication No. H5-280785

TECHNICAL PROBLEM

With the technology described in Patent Literature 1 and Patent Literature 2, a plurality of air conditioners are categorized into fixed groups, and the running mode is controlled for each group. As a result, comfort and energy efficiency are degraded in some cases.

SUMMARY

The present disclosure has been devised in light of the above circumstances, and takes as an objective to provide a facility equipment operation device and the like able to detect mismatched running of a plurality of individually controlled facility equipment.

In order to achieve the above object, a facility equipment operation device according to the present disclosure is provided with:

affected section determiner configured to compute an affected section, the affected section being a section affected by a controlled equipment that is a facility equipment with a changed control parameter, by referencing data including an installation position of facility equipment in an objective space, and a capability related to an area affected by the facility equipment; and mismatch detector configured to detect a mismatched state on the basis of whether or not an effect exerted by the controlled equipment on the affected section when the controlled equipment operates according to the changed control parameter, and an effect exerted on the affected section by a facility equipment currently operating, are in a predetermined relationship.

According to the present disclosure, it is possible to detect a mismatched state in individual sections affected by facility equipment. Consequently, it is possible to detect mismatched running of individually controlled facility equipment.

BRIEF DESCRIPTION OF DRAWINGS

FIG. 6 is a diagram illustrating operating state data according to Embodiment 1;

FIG. 7 is a diagram illustrating an example of effect determination rule data;

FIG. 14 is a diagram illustrating another example of sections dividing an air-conditioned space;

FIG. 19 is a diagram illustrating operating state data according to Embodiment 2;

FIG. 23 is a diagram illustrating, for individual sections in Embodiment 2, the effects exerted by controlled equipment and all other indoor units when the controlled equipment operates according to modified control parameters, and the equipment addresses of the originating indoor units exerting the effects.

DETAILED DESCRIPTION

Figure 1:
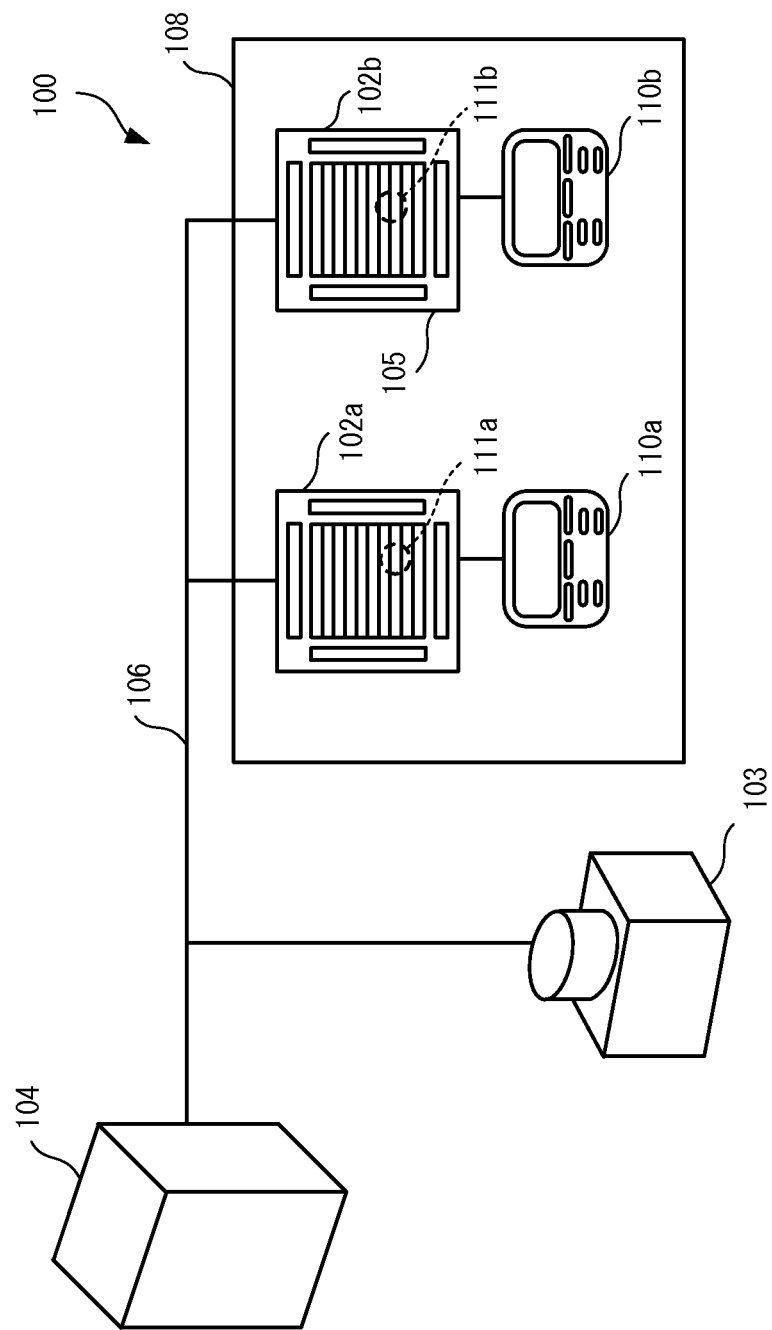
FIG. 1 is a diagram illustrating a configuration of an air conditioner operation system according to Embodiment 1 of the present disclosure.

Hereinafter, exemplary embodiments of the present disclosure will be described with reference to the drawings. In the drawings, the same elements are denoted by the same signs.

Embodiment 1

As illustrated in FIG. 1, an air conditioning system 100 that acts as a facility equipment system according to Embodiment 1 of the present disclosure is equipped with a plurality of indoor units 102a and 102b, an outdoor unit 103, and an air conditioner operation device 104, which are communicably interconnected via a communication line 106. The communication line 106 is a general-purpose network, an air conditioning system network, or the like, for example, and may be made up of cable lines, radio lines, or the like.

The plurality of indoor units 102a and 102b are installed inside a building, for example, and air-condition an objective space 108 by operating together with the outdoor unit 103 connected by refrigerant pipes (not illustrated) and the communication line 106. The objective space 108 is a room containing a continuous space, for example. Typically, there are no partitions or the like inside the room.

Each of the indoor units 102a and 102b is an air conditioner that air-conditions sections respectively corresponding to the indoor units 102a and 102b from among sections that divide the objective space 108. The indoor units 102a and 102b are equipped with remote controls 110a and 110b, and temperature sensors 111a and 111b, respectively.

Each of the remote controls 110a and 110b is provided with user-operated buttons, a touch panel, and the like, and outputs control commands corresponding to operations to the indoor unit 102a or 102b. Control commands are commands indicating control parameters which are parameters for controlling each of the indoor units 102a and 102b, for example, and include a type and a value. The types of control parameters included in control commands may be "onoff", "operating mode", and "set temperature", for example. A control parameter with the type "onoff" may have a value, string, or the like expressing "activate" or "stop", for example. If the type of the control parameter is "operating mode", the control parameter may have a value, string, or the like expressing "cooling mode", "heating mode", or "ventilation mode", for example. If the type of the control parameter is "set temperature", the value of the control parameter may be a numerical value or the like expressing a set temperature, for example.

Each of the temperature sensors 111a and 111b is a sensor that measures the room temperature and outputs temperature information indicating the measured temperature. Each of the temperature sensors 111a and 111b measures the temperature at an intake port by which each of the indoor units 102a and 102b takes in air, for example. "Room temperature" is one type of control parameter, and this control parameter includes a numerical value or the like expressing the temperature measured by each of the temperature sensors 111a and 111b, for example. Each of the indoor units 102a and 102b may operate individually in any of cooling mode, heating mode, or ventilation mode, depending on these control parameters.

In the cooling mode, each of the indoor units 102a and 102b cools air taken in and then blows out the cooled-down air, thereby regulating the room temperature of a predetermined space to stay within a predetermined range based on a set temperature. In the heating mode, each of the indoor units 102a and 102b heats air taken in and then blows out the heated-up air, thereby regulating the room temperature of a predetermined space to stay within a predetermined range based on a set temperature. In the ventilation mode, each of the indoor units 102a and 102b blows out air taken in, thereby circulating air into the predetermined space on the downstream in the blow-out direction.

Note that the locations provided with each of the temperature sensors 111a and 111b are not limited to the intake ports of the indoor units 102a and 102b, and may be any location enabling the measurement of the room temperature or a temperature that may be regarded as the room temperature.

Figure 2:
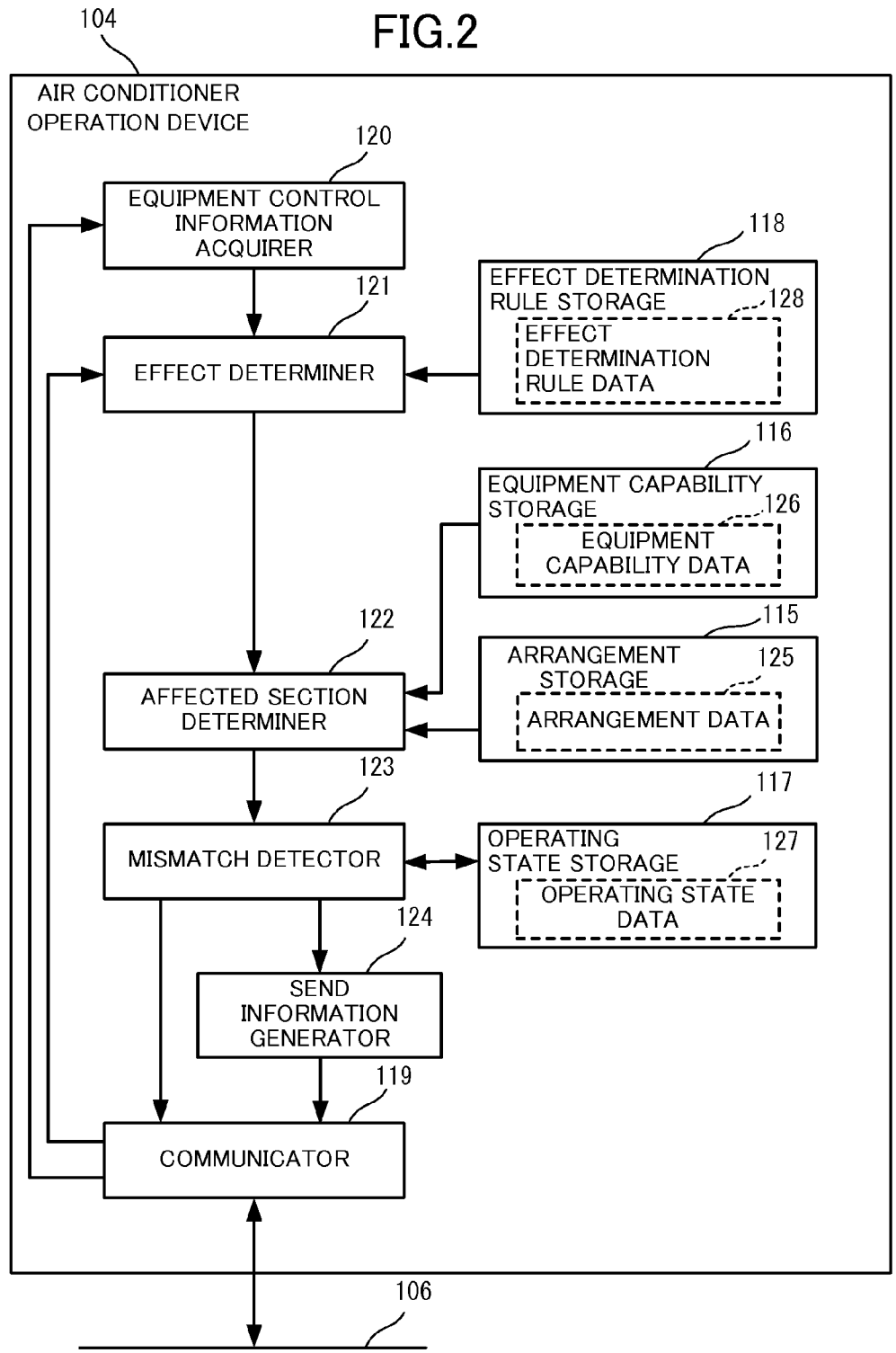
FIG. 2 is a block diagram illustrating a functional configuration of an air conditioner operation device according to Embodiment 1.

The air conditioner operation device 104 is a device for operating the plurality of indoor units 102a and 102b, and monitors and controls the plurality of indoor units 102a and 102b. As illustrated in FIG. 2, the air conditioner operation device 104 is functionally equipped with arrangement storage 115, equipment capability storage 116, operating state storage 117, effect determination rule storage 118, a communicator 119, an equipment control information acquirer 120, an effect determiner 121, an affected section determiner 122, a mismatch detector 123, and a send information generator 124.

As illustrated in the drawing, each of the arrangement storage 115, the equipment capability storage 116, the operating state storage 117, and the effect determination rule storage 118 stores arrangement data 125, equipment capability data 126, operating state data 127, and effect determination rule data 128, respectively.

Figures 3, 4, 5:
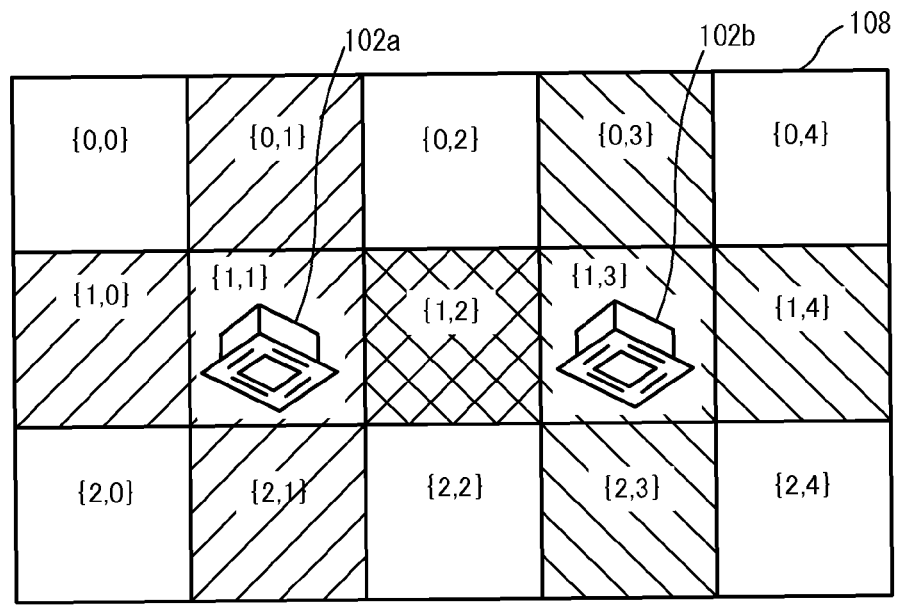
FIG. 3 is a diagram illustrating arrangement data according to Embodiment 1.
FIG. 4 is a diagram illustrating sections dividing an air-conditioned space according to Embodiment 1, and the installation positions and affected sections of air conditioners associated with the sections.
FIG. 5 is a diagram illustrating an example of equipment capability data.

The arrangement data 125 is data indicating the installed state of each of the indoor units 102a and 102b installed to air-condition the objective space 108. As illustrated in FIG. 3, the arrangement data 125 associates an equipment address, an equipment type, an installation position, and an installation direction.

The equipment address indicates the address of each of the indoor units 102a and 102b on the communication line 106, as identification information for identifying each of the indoor units 102a and 102b.

The equipment type is equipment identification information for identifying a group to which each of the indoor units 102a and 102b belongs.

The installation position is installation position information that indicates a position in the objective space 108 where each of the indoor units 102a and 102b is installed, and is expressed by the position of a section in a grid that divides the objective space 108.

In the present embodiment, as illustrated in FIG. 4, the objective space 108 forms a rectangle when viewed from above, and is divided into sections that form squares of the same size. The position of each section is expressed as (m, n), in which (m, n) represents the mth row and the nth column, where the upper-left of the drawing is treated as (0, 0).

The installation direction is installation direction information that indicates a direction in which each of the indoor units 102a and 102b is installed, and is for specifying the direction in which the blow-out port of each of the indoor units 102a and 102b faces. In the present embodiment, the installation direction is a direction of a reference direction predetermined for each of the indoor units 102a and 102b in a reference plane (horizontal plane) normal to a specific direction (the vertical direction) in the objective space 108, and is expressed as a unit vector in the coordinate system defined on the reference plane. The reference direction is determined to be the direction faced by one of the blow-out ports of each of the indoor units 102a and 102b, for example. In the present embodiment, an installation direction of $\{1, 0\}$ indicates that the reference direction configured for the indoor units 102a and 102b faces in the row direction of the sections.

The equipment capability data 126 is data associating a group and a capability for individual groups that share in common a capability related to the range affected by each of the indoor units 102a and 102b.

For example, as illustrated in FIG. 5, the equipment capability data 126 associates an equipment type with a shared capability related to the range affected by each of the indoor units 102a and 102b belonging to that equipment type. The capability is expressed as a blow-out direction shared in common among the indoor units 102a and 102b that belong to the relevant equipment type, and a reach of air blown out to in each direction (airflow area).

The blow-out direction is expressed as a unit vector in the coordinate system on the reference plane for which the reference direction configured for the indoor units 102a and 102b becomes $(1, 0)$. The airflow area is expressed in terms of a predefined reference length. In the present embodiment, the length of one edge of a square section is expressed as "1".

For example, in the equipment capability data 126 illustrated in FIG. 5, the capability "$\{\{1, 0\}, 1\}\{\{-1, 0\}, 1\}\{\{0, 1\}, 1\}\{\{0, -1\}, 1\}$" is associated with the equipment type "4-way blow-out indoor unit". This capability includes the four elements $\{\{1, 0\}, 1\}, \{\{-1, 0\}, 1\}, \{\{0, 1\}, 1\}$, and $\{\{0, -1\}, 1\}$, which correspond to the number of blow-out directions. Each element includes a blow-out direction and an airflow area. For example, $\{\{1, 0\}, 1\}$ indicates that the blow-out direction of $\{1, 0\}$ has an airflow area of "1".

The operating state data 127 is data associating a section affected by an indoor unit 102a in operation with the effect on that section. As illustrated in FIG. 6, the operating state data 127 associates a section with an equipment address and effect of an indoor unit 102a in operation.

The section is section information that indicates the position of each section. The equipment address of an indoor unit 102a in operation is an equipment address of indoor units 102a and 102b that are currently operating from among the plurality of indoor units 102a and 102b.

The effect is effect information that indicates an effect that the operation of the indoor units 102a and 102b exerts on the space. For example, "cool" is the effect when the indoor units 102a and 102b are operating in cooling mode. For example, "heat" is the effect when the indoor units 102a and 102b are operating in heating mode. For example, "ventilate" is the effect when the indoor units 102a and 102b are operating in ventilation mode. FIG. 6 illustrates an example in which the indoor unit 102a with the equipment address "1" is currently operating and exerting the "cool" effect on the sections expressed as $\{0, 1\}, \{1, 0\}, \{1, 1\}, \{1, 2\}$, and $\{2, 1\}$.

The effect determination rule data 128 is data stipulating a rule for determining, in the case in which a control parameter is changed for any of the indoor units 102a and 102b, the effect exerted on an affected section (exerted effect) when that indoor unit 102a or 102b operates according to the changed control parameter. As illustrated in FIG. 7, the effect determination rule data 128 associates an effect with a determination rule.

Herein, the control parameters are changed in cases such as when one of the remote controls 110a and 110b is operated, or when the temperature measured by one of the temperature sensors 111a and 111b changes. Hereinafter, an indoor unit 102a or 102b with a changed control parameter will be designated the controlled equipment. The present embodiment describes an example in which an indoor unit 102b is the controlled equipment, and is designated the controlled equipment 102b. An affected section refers to a section that is affected when the controlled equipment 102b operates according to a changed control parameter.

Referring back to FIG. 2, the communicator 119 sends and receives information to and from each of the indoor units 102a and 102b via the communication line 106. The communicator 119 generates information to be sent, and interprets received information.

The equipment control information acquirer 120 acquires equipment control information sent from the controlled equipment 102b via the communicator 119. Equipment control information is information that includes a changed control parameter (such as type or temperature) that has been changed in the controlled equipment 102b, and the equipment address of the controlled equipment 102b.

The effect determiner 121 determines the exerted effect by referencing the effect determination rule data 128. Specifically, the effect determiner 121 extracts an effect associated with a determination rule satisfied by the changed control parameter included in the equipment control information, and determines the extracted effect as the exerted effect.

At this point, among the control parameters required to apply a determination rule, the equipment control information acquirer 120 may also not acquire control parameters that have not been changed in the controlled equipment 102b. In this case, among the control parameters required to apply a determination rule, control parameters that are not included in the equipment control information acquired by the equipment control information acquirer 120 may be requested by the effect determiner 121 from the controlled equipment 102b via the communicator 119, for example. The effect determiner 121 is able to acquire equipment control information that includes the control parameters that have not been changed in the controlled equipment 102b from the controlled equipment 102b in response to the request.

The affected section determiner 122 computes affected sections by referencing the arrangement data 125 and the equipment capability data 126.

The mismatch detector 123 detects a mismatched state in the affected sections.

Specifically, the mismatch detector 123 references the exerted effect, and the effects of the indoor units 102a other than the controlled equipment 102b that are associated with the affected sections in the operating state data 127. The mismatch detector 123 detects a mismatched state in the affected sections on the basis of the relationship between the referenced effects.

More specifically, if there is a combination that is predetermined as a relationship in which the effects referenced for an affected section impede each other, the mismatch detector 123 detects that the relevant affected section is in a mismatched state. If there is not a combination that is predetermined as a relationship in which the effects referenced for an affected section impede each other, the mismatch detector 123 detects that the relevant affected section is not in a mismatched state.

For example, since the effects of "cool" and "heat" are contradictory, the combination of the "cool" and "heat" effects may be determined as a mutually impeding relationship.

The send information generator 124 generates send information when a mismatched state is detected by the mismatch detector 123. The send information is information to send to the controlled equipment 102b and currently operating equipment other than the controlled equipment 102b, that is, the indoor unit 102a, that is affecting the affected section. The send information includes one or more of control equipment information to stop the operation of the recipient indoor units 102a and 102b, warning information causing an indication that a mismatched state has been detected to be displayed on the remote controls 110a and 110b of the recipient indoor units 102a and 102b, and the like, for example.

The air conditioner operation device 104 is physically made up of components such as a processor, random access memory (RAM), read-only memory (ROM), flash memory, and a communication interface, for example. The arrangement storage 115, the equipment capability storage 116, the operating state storage 117, and the effect determination rule storage 118 are realized by the flash memory, for example. The communicator 119 is realized by the communication interface, for example. The equipment control information acquirer 120, the effect determiner 121, the affected section determiner 122, the mismatch detector 123, and the send information generator 124 are realized by the processor executing a software program stored in the ROM, for example.

In addition, the functions provided in the air conditioner operation device 104 may also be realized by a general-purpose computer that executes an installed program. The program may be distributed by being recorded onto various computer-readable storage media, or distributed via a communication line such as the Internet.

The foregoing describes a configuration of an air conditioning system 100 and an air conditioner operation device 104 according to Embodiment 1. The following will describe the operation of the air conditioning system 100 and the air conditioner operation device 104.

The controlled equipment 102b with a modified control parameter generates equipment control information by associating an equipment address with the changed control parameter, and sends the equipment control information to the air conditioner operation device 104.

Figure 8:
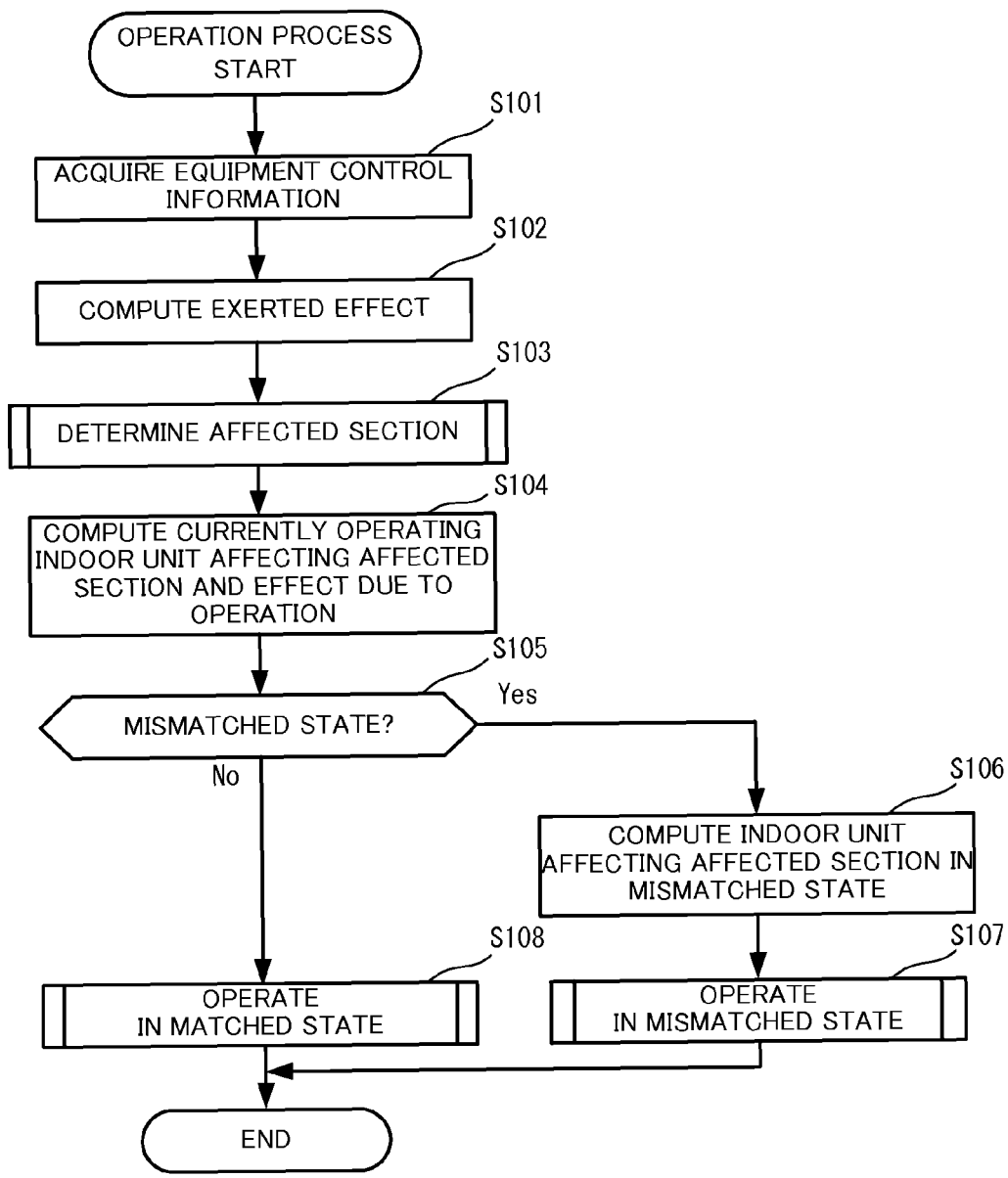
FIG. 8 is a flowchart illustrating a flow of an operation process according to Embodiment 1.

If equipment control information is sent from the controlled equipment 102b while the air conditioner operation device 104 is operating, the equipment control information acquirer 120 receives the equipment control information via the communicator 119 as illustrated in FIG. 8 (step S101).

In the present embodiment, suppose that the user operates the remote control 110b with the intention of causing the controlled equipment 102b to operate in "cooling mode" at a "set temperature of 28° C.", but due to mistaken operation, a control command for "heating mode" at a "set temperature of 28° C." is output from the remote control 110b to the controlled equipment 102b. In this case, the equipment control information acquired by the equipment control information acquirer 120 includes the equipment address "2" of the controlled equipment 102b, and control parameters that activate the controlled equipment 102b with "heating mode" set as the "operating mode" and "28° C." set as the "set temperature". Suppose that the content of the equipment control information is expressed as {2, operating mode, heating} and {2, set temperature, 28° C.}.

Note that although the equipment control information may be output from the controlled equipment 102b as discussed above, the air conditioner operation device 104 itself may also acquire information such as measured values from sensors and generate the equipment control information.

The effect determiner 121 computes, as the exerted effect, the effect that the controlled equipment 102b exerts on affected sections when the controlled equipment 102b operates according to the equipment control information acquired by the equipment control information acquirer 120 (step S102).

Specifically, the effect determiner 121 references the effect determination rule data 128 illustrated in FIG. 7, for example, extracts a determination rule that satisfies the control parameters included in the equipment control information, and computes the effect associated with that determination rule as the exerted effect. As illustrated in FIG. 7, the control parameters required to apply a determination rule are the "operating mode", the "set temperature", and the "room temperature".

In the present embodiment, the equipment control information acquirer 120 acquires equipment control information that includes {2, operating mode, heating} and {2, set temperature, 28° C.}. For equipment control information that indicates the value of the control parameter of type "room temperature", the effect determiner 121 requests and acquires the information from the controlled equipment 102b. In the present embodiment, suppose that as a result of the controlled equipment 102b acquiring temperature information indicating "29° C." from the temperature sensor 111b, the equipment control information that the effect determiner 121 acquires from the controlled equipment 102b is {2, room temperature, 29° C.}.

The effect determiner 121 applies control parameters specifying heating as the operating mode, 28° C. as the set temperature, and 29° C. as the room temperature to the determination rules included in the effect determination rule data 128. As a result, the effect determiner 121 computes "heat" as the exerted effect.

The affected section determiner 122 acquires exerted effect information indicating the exerted effect and the equipment control information from the effect determiner 121, and computes the affected sections (step S103).

Figure 9:
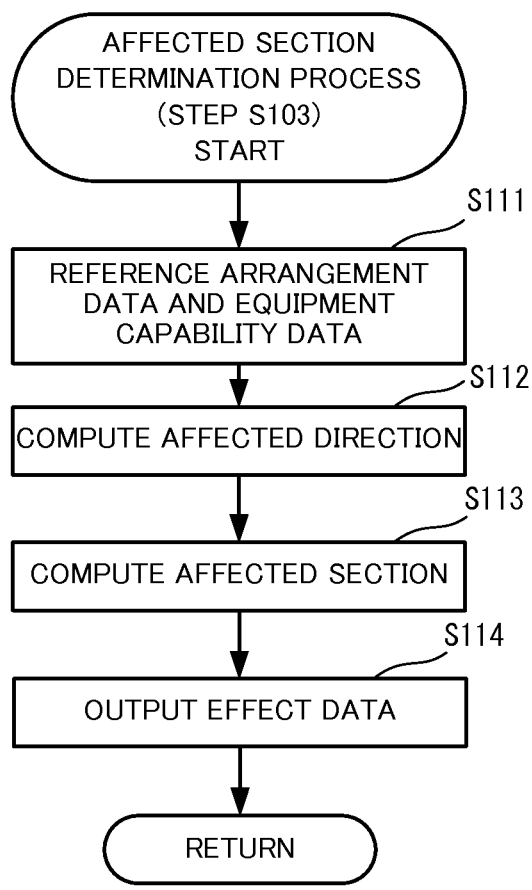
FIG. 9 is a flowchart illustrating a flow of an affected section determination process according to Embodiment 1.

Specifically, as illustrated in FIG. 9, the affected section determiner 122 references the arrangement data 125 and the equipment capability data 126 (step S111), and computes an affected direction (step S112). The affected direction is a direction in which the controlled equipment 102b exerts an effect in the objective space 108.

In the present embodiment, the affected section determiner 122 extracts "4-way blow-out indoor unit" as the "equipment type" and "{1, 0}" as the "installation direction", which are associated in the arrangement data 125 with the equipment address "2" included in the equipment control information. The affected section determiner 122 extracts the capability "{{1, 0}, 1}{{-1, 0}, 1}{{0, 1}, 1}{{0, -1}, 1}}" that is associated in the equipment capability data 126 with the "equipment type" of "4-way blow-out indoor unit".

The affected section determiner 122 computes the affected directions by suitably rotating the blow-out direction included in the "capability" extracted from the equipment capability data 126, according to the "installation direction" extracted from the arrangement data 125. In the present embodiment, since the "installation direction" is "{1, 0}", rotation is unnecessary. As a result, the affected section determiner 122 computes {1, 0}{-1, 0}{-1, 0}{1, 1} as the affected directions.

At this point, assuming that the "installation direction" is "{0, 1}", the affected section determiner 122 computes the affected directions by rotating the blow-out direction {x, y} included in the "capability" to {-y, x}.

The affected section determiner 122 computes the affected sections (step S113).

In the present embodiment, the affected section determiner 122 extracts "{1, 1}" as the "installation position" associated in the arrangement data 125 with the equipment address "2" included in the equipment control information. The affected section determiner 122 extracts the airflow area "1" included in the "capability" extracted in step S112. The affected section determiner 122 computes the positions of sections included in the "installation position" of "{1, 1}" as well as sections in the affected directions computed in step S112 from the "installation position" up to the extracted airflow area of "1", as affected sections. Consequently, the affected sections computed in the present embodiment become {1, 3}, {2, 3}, {0, 3}, {1, 4}, and {1,2}.

The affected section determiner 122 generates effect data that includes the affected sections computed in step S113, the equipment address included in the equipment control information, and the exerted effect indicated by the exerted effect information acquired from the effect determiner 121, and outputs the effect data to the mismatch detector 123 (step S114).

In the present embodiment, suppose that the effect data includes the affected sections, the equipment address, and the exerted effect, and is expressed as {{1, 3}{2, heat}}, {{2, 3}{2, heat}}, {{0, 3}{2, heat}}, {{1, 4}{2, heat}}, and {{1, 2}{2, heat}}.

Referring again to FIG. 8, the mismatch detector 123 acquires the effect data, and computes the equipment address and effect of currently operating indoor units 102a other than the controlled equipment 102b that are associated in the operating state data 127 with all affected sections included in the effect data (step S104).

Herein, the operating state data 127 referenced in step S104 is data related to currently operating indoor units 102a other than the controlled equipment 102b. In other words, if the controlled equipment 102b is already operating, and relevant operating state data 127 is being stored in the operating state storage 117, that operating state data 127 is excluded from the processing in step S104.

In the present embodiment, the affected sections included in the effect data are {1, 3}, {2, 3}, {0, 3}, {1, 4}, and {1, 2}. The equipment addresses and effects of currently operating indoor units 102a other than the controlled equipment 102b that are associated in the operating state data 127 illustrated in FIG. 6 are all {1, cool}. Consequently, the mismatch detector 123 computes {1, cool} as the equipment address and effect of a currently operating indoor unit 102a other than the controlled equipment 102b for each of {1, 3}, {2, 3}, {0, 3}, {1, 4}, and {1,2}.

For each affected section included in the effect data, the mismatch detector 123 references the effect associated with the affected section in the effect data with the effect exerted on the affected section by a currently operating indoor unit 102a other than the controlled equipment 102b. The mismatch detector 123 detects a mismatched state by determining whether or not there is a combination that is predetermined as a relationship in which the referenced effects impede each other (step S105).

Specifically, the mismatch detector 123 determines a mismatched state when at least one predetermined combination is included among the affected sections included in the effect data (step S105; Yes). If no predetermined combinations are included among the affected sections included in the effect data, the mismatch detector 123 determines that there is not a mismatched state (step S105; No).

Figures 10, 11:
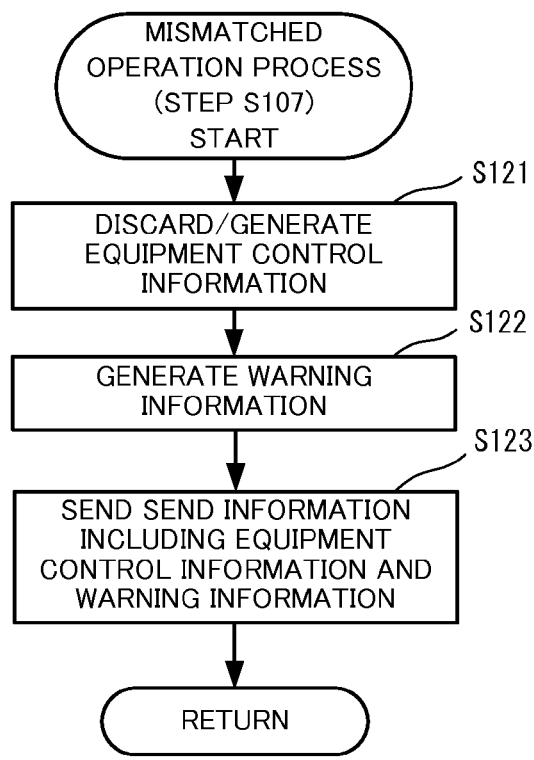
FIG. 10 is a diagram illustrating, for individual sections in Embodiment 1, the effects exerted by controlled equipment and all other indoor units when the controlled equipment operates according to modified control parameters, and the equipment addresses of the indoor units exerting the effects.
FIG. 11 is a flowchart illustrating a flow of a mismatched operation process.

In the present embodiment, suppose that "heat" and "cool" are determined as a combination of mutually impeding effects. Among the effects referenced in step S104, the effects related to the affected section {1, 2} are a combination of "heat" and "cool", as illustrated in FIG. 10.

Consequently, the mismatch detector 123 searches the referenced effects for a combination of "heat" and "cool", and thereby determines that there is a combination of "heat" and "cool" among the affected sections included in the effect data. As a result, the mismatch detector 123 determines that there is a mismatched state.

At this point, if an effect referenced by the mismatch detector 123, or in other words, the exerted effect by the controlled equipment 102b or an effect by a currently operating indoor unit 102a other than the controlled equipment 102b, is "ventilation", that effect may be excluded from the effects searched by the mismatch detector 123.

In the case of determining that there is a mismatched state (step S105; Yes), the mismatch detector 123 computes the equipment addresses of the indoor units 102a and 102b exerting effects on the affected sections in a mismatched state. In other words, the mismatch detector 123 computes the equipment address of the controlled equipment 102b, and the equipment address of a currently operating indoor unit 102a other than the controlled equipment 102b that is exerting an effect on the affected sections in a mismatched state (step S106).

In the present embodiment, the mismatch detector 123 computes the equipment address "2" of the controlled equipment 102b, and the equipment address "1" of a currently operating indoor unit 102a other than the controlled equipment 102b that is exerting an effect on the affected sections in a mismatched state.

The send information generator 124 executes a mismatched operation process (step S107).

Specifically, as illustrated in FIG. 11, the send information generator 124 discards the equipment control information acquired by the equipment control information acquirer 120. Subsequently, the send information generator 124 generates equipment control information that stops the operation of the indoor units 102a and 102b at the equipment addresses extracted in step S106 as send information (step S121).

In the present embodiment, the send information generator 124 discards the equipment control information acquired by the equipment control information acquirer 120. The send information generator 124 generates equipment control information {1, operation onoff, stop (0)} that stops the indoor unit 102a with the equipment address "1", and equipment control information {2, operation onoff, stop (0)} that stops the controlled equipment 102b with the equipment address "2".

The send information generator 124 generates warning information causing an indication that there is a mismatched state to be displayed on the remote controls 110a and 110b of the indoor units 102a and 102b at the equipment addresses extracted in step S106 as send information (step S122).

The communicator 119 acquires the send information (including equipment control information and warning information) generated by the send information generator 124, and sends the equipment control information as a first sending means and the warning information as a second sending means to the equipment addresses extracted in step S106 (step S123).

Each of the indoor units 102a and 102b receives the above send information, and stops operation in accordance with the equipment control information included in the send information. Consequently, the mismatched state is resolved, and degradations in comfort and energy efficiency in the affected sections may be minimized.

In addition, each of the indoor units 102a and 102b that receives the send information displays an indication that there is a mismatched state on the remote controls 110a and 110b, for example, in accordance with the warning information included in the send information. Consequently, the user learns that there is a mismatched state, and becomes able to take measures to resolve the mismatched state. As a result, an improvement in comfort and energy efficiency in the affected sections potentially becomes possible.

Referring to FIG. 8, in the case of determining that there is not a mismatched state (step S105; No), the mismatch detector 123 executes a matched operation process (step S108).

Figures 12, 13:
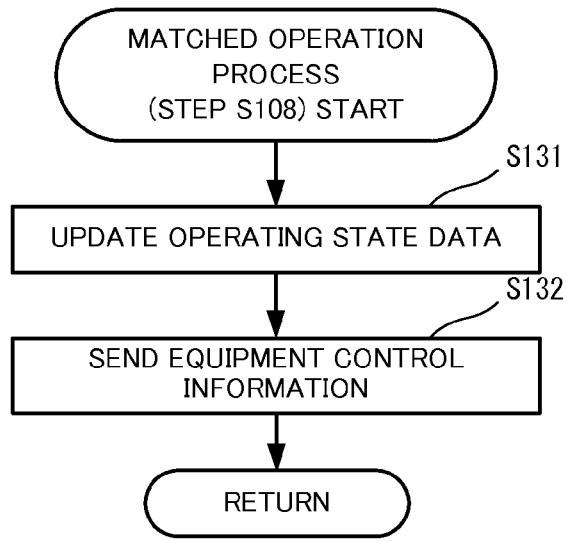
FIG. 12 is a flowchart illustrating a flow of a matched operation process.
FIG. 13 is a diagram illustrating an example of operating state data that is updated because there is no mismatched state.
Figure 15:
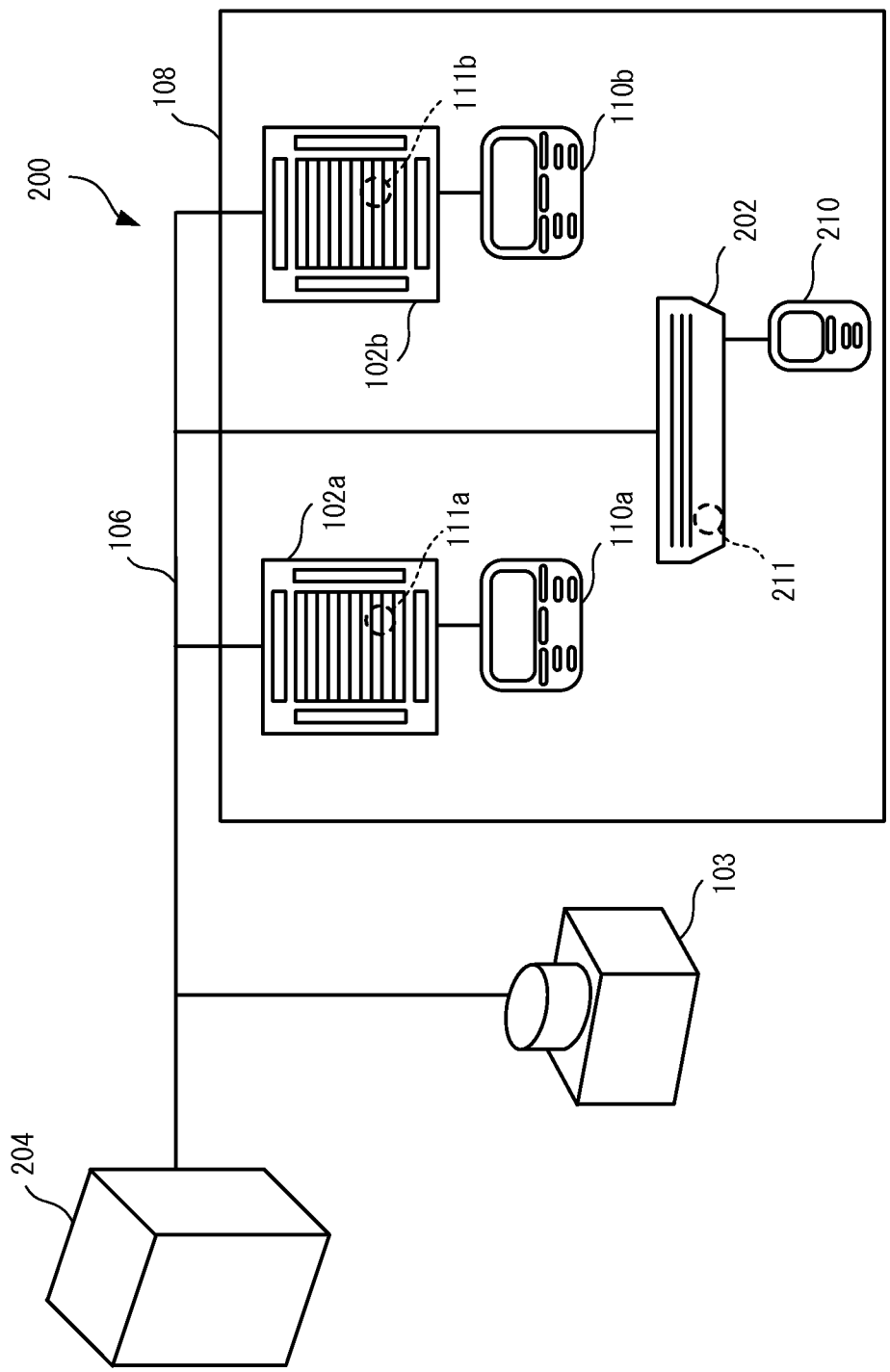
FIG. 15 is a diagram illustrating a configuration of an air conditioner operation system according to Embodiment 2 of the present disclosure.

Specifically, as illustrated in FIG. 12, the mismatch detector 123 causes the operating state storage 117 to store the operating state data 127 in the case of operating the controlled equipment 102b according to the changed control parameters. Consequently, the mismatch detector 123 updates the operating state data 127 (step S131). At this point, if the indoor unit 102b that is the controlled equipment is already operating, and the relevant operating state data 127 is being stored in the operating state storage 117, that operating state data 127 may be deleted.

For example, in the present embodiment, assuming that the operating mode of the controlled equipment 102b is "cooling mode" rather than "heating mode", it is determined that there is not a mismatched state (step S105; No), and the operating state storage 117 is updated by the operating state data 127 illustrated in FIG. 13. Consequently, the operating state data 127 may be updated with content that includes the indoor units 102a and 102b that are actually in current operation, the sections being affected by the operation, and the effects on the sections.

The communicator 119 acquires equipment control information from the mismatch detector 123, and sends the equipment control information as a third sending means to the equipment address of the controlled equipment 102b (step S132). Consequently, the controlled equipment 102b operates according to the control command output from the remote control 110b by a user operation. A mismatched state does not occur even if this operation is started. For this reason, comfort and energy efficiency in the affected sections becomes possible.

In the present embodiment as described in the foregoing, a mismatched state is detected on the basis of the relationship of effects on affected sections. For this reason, a mismatched state caused by the operation of a plurality of individually controlled facility equipment may be detected.

A mismatched state is detected according to whether or not effects on affected sections exist in a mutually impeding relationship. For this reason, it becomes possible to minimize degradations in comfort and energy efficiency.

A mismatched state is detected according to whether or not effects on affected sections exist in a combination predetermined as a mutually impeding relationship. For this reason, a mismatched state may be detected precisely.

In the present embodiment, effects are categorized according to the properties of the operating mode in the operating state data 127 and the effect determination rule data 128. Subsequently, a mismatched state is detected on the basis of these categorized effects. For this reason, it is possible to precisely determine whether or not there is a mismatched state.

More specifically, in the present embodiment, effects are categorized into "cool", "heat", and "ventilate". For this reason, it is possible to precisely determine the effect produced by the operation of each of the indoor units 102a and 102b controlled on the basis of a plurality of types of control parameters, such as operating mode and set temperature.

The equipment capability data 126 is data that may be preconfigured at the time of factory shipment or the like, while the operating state data 127 is continuously updated during the operation of the air conditioning system 100. For this reason, only the arrangement data 125 requires configuration when newly installing an air conditioning system 100, installing another indoor unit 102a or 102b, or the like. When installing an air conditioning system 100, installing another indoor unit 102a or 102b, or the like, the workload for the installation technician may be reduced compared to the case of the installation technician configuring the affected sections of each of the indoor units 102a and 102b.

The equipment capability data 126 includes a capability related to the range of effect that are shared in common among indoor units 102a and 102b belonging to a group indicated by the same equipment type, and this capability includes the direction of airflow produced by the indoor units 102a and 102b, and the reach of the airflow. The arrangement data 125 includes an installation position as well as an installation direction for each of the indoor units 102a and 102b. Consequently, the sections affected by the effects produced by the operation of each of the indoor units 102a and 102b may be computed accurately. Accordingly, it becomes possible to accurately detect a mismatched state.

The foregoing thus describes Embodiment 1 of the present disclosure, but an embodiment of the present disclosure is not limited to the above.

For example, although the present embodiment describes an example in which the air conditioner operation device 104 which is a facility equipment operation device operates indoor units 102a and 102b which are air conditioners, the facility equipment to be operated by the facility equipment operation device may also be lighting equipment or the like, for example.

Figure 14:
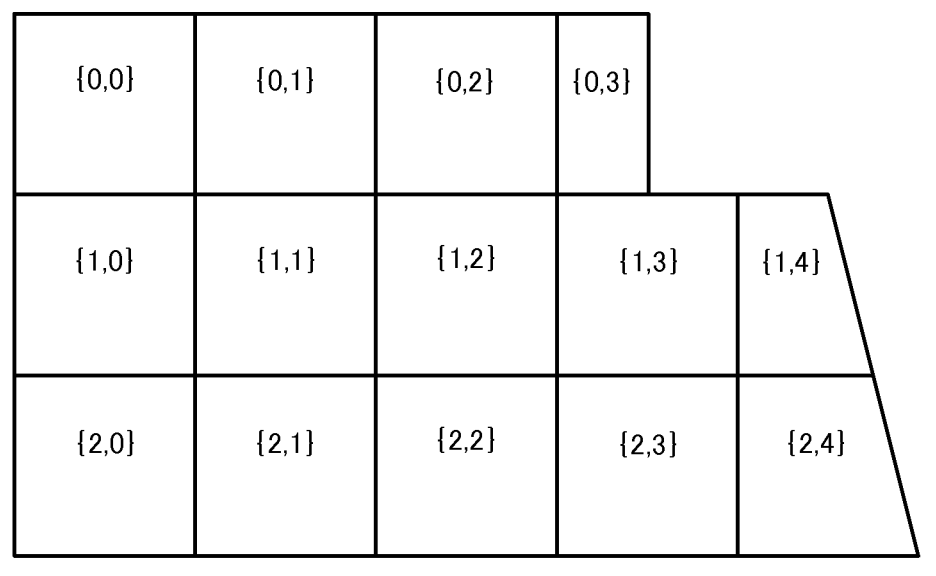

For example, in the present embodiment, the sections are all treated as square areas of the same size. However, the sections may not necessarily have the same size, and are also not necessarily square areas. For example, sections with different sizes and shapes may be configured for an objective space, as illustrated in FIG. 14.

For example, when a mismatched state is detected, the air conditioner operation device 104 is configured to stop the operation of all indoor units 102a and 102b exerting effects on affected sections in a mismatched state. However, when a mismatched state is detected, the air conditioner operation device 104 may also discard the equipment control information to stop the operation of the controlled equipment 102b, while continuing the operation of an indoor unit 102a that is already operating. According to this configuration, the occurrence of a mismatched state may still be minimized. Consequently, it becomes possible to minimize degradations in energy efficiency and comfort.

In addition, when a mismatched state is detected, the air conditioner operation device 104 may also allow control based on the equipment control information for the indoor unit 102b that is the controlled equipment. At this point, the air conditioner operation device 104 may generate and send warning information only to one or both of an indoor unit 102a and the controlled equipment 102b. As a result, the user may be informed of the mismatched state, and the user may be encouraged to take suitable measures. Consequently, it becomes possible to minimize degradations in energy efficiency and comfort.

Modification 1

As an example, in the present embodiment, the mismatch detector 123 determines that there is a mismatched state when referenced effects impede each other. However, a mismatched state is not limited to the above case. The mismatch detector 123 may also determine that there is a mismatched state when the referenced effects are different.

Suppose that the operating modes include a "dehumidifying mode" in addition to "cooling mode", "heating mode", and "ventilation mode". In this case, the effects of "cooling mode", "heating mode", and "ventilation mode" are "cool", "heat", and "ventilate", respectively. The effect of "dehumidifying mode" may be "cool" or "dehumidify".

Suppose that the effect of "dehumidifying mode" is "dehumidify", and while an indoor unit 102a is operating in cooling mode, a control command to operate in "dehumidifying mode" is output to the controlled equipment 102b.

When the effect of the currently operating indoor unit 102a is exerted on any of the affected sections of the controlled equipment 102b, the effects on the relevant section become "dehumidify" and "cool". In this case, the mismatch detector 123 may determine that there is a mismatched state, since the effects differ from each other. Subsequently, the send information generator 124 may generate equipment control information causing the indoor unit 102a operating in "cooling mode" to operate in "dehumidifying mode", and send the equipment control information to the indoor unit 102a.

As a result, a mismatched state may be detected and resolved. In addition, generally, operation in "dehumidifying mode" consumes less energy than operation in "cooling mode". For this reason, it becomes possible to conduct control with higher energy savings, without impairing user comfort.

Embodiment 2

The air conditioner operation device 104 according to Embodiment 1 detects a mismatched state on the basis of an effect exerted directly by the controlled equipment 102b, and an effect by a currently operating indoor unit 102a other than the controlled equipment 102b. The air conditioner operation device according to Embodiment 2 detects a mismatched state by additionally accounting for an effect in an affected section, spread over to another section due to airflow produced by indoor unit operation.

The air conditioning system 200 according to the present embodiment is equipped with an indoor unit 202 in addition to the configuration of the air conditioning system 100 according to Embodiment 1, and is equipped with an air conditioner operation device 204 instead of the air conditioner operation device 104 according to Embodiment 1.

The indoor unit 202, similarly to the other indoor units 102a and 102b, is communicably connected to the air conditioner operation device 204 via the communication line 106, and is equipped with a remote control 210 operated by a user and a temperature sensor 211 that measures the room temperature. The indoor unit 202, similarly to the other indoor units 102a and 102b, operates in "cooling mode", "heating mode", and "ventilation mode" according to operations on the remote control 210 by the user. Unlike the other indoor units 102a and 102b, the equipment type of the indoor unit 202 is "1-way blow-out indoor unit".

The air conditioner operation device 204 according to the present embodiment, similarly to the air conditioner operation device 104 according to Embodiment 1, is a device for operating the plurality of indoor units 102a, 102b, and 202, and monitors and controls the plurality of indoor units 102a, 102b, and 202.

Figure 16:
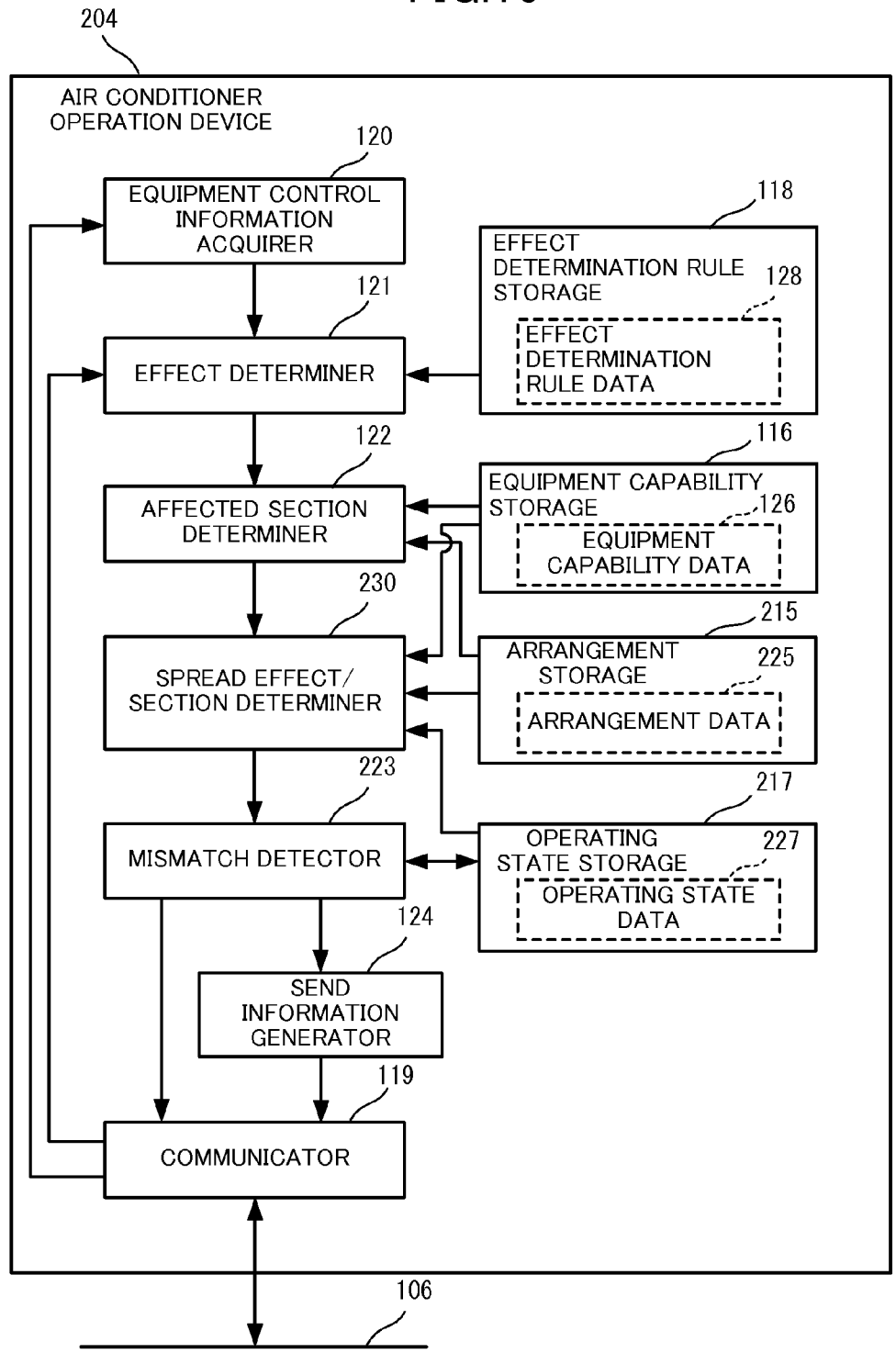
FIG. 16 is a block diagram illustrating a functional configuration of an air conditioner operation device according to Embodiment 2.

As illustrated in FIG. 16, the air conditioner operation device 204 is equipped with a spread effect/section determiner 230 in addition to the configuration provided in the air conditioner operation device 104 according to Embodiment 1. In addition, the air conditioner operation device 204 is equipped with arrangement storage 215, operating state storage 217, and a mismatch detector 223 instead of the arrangement storage 115, the operating state storage 117, and the mismatch detector 123 according to Embodiment 1.

Figures 17, 18:
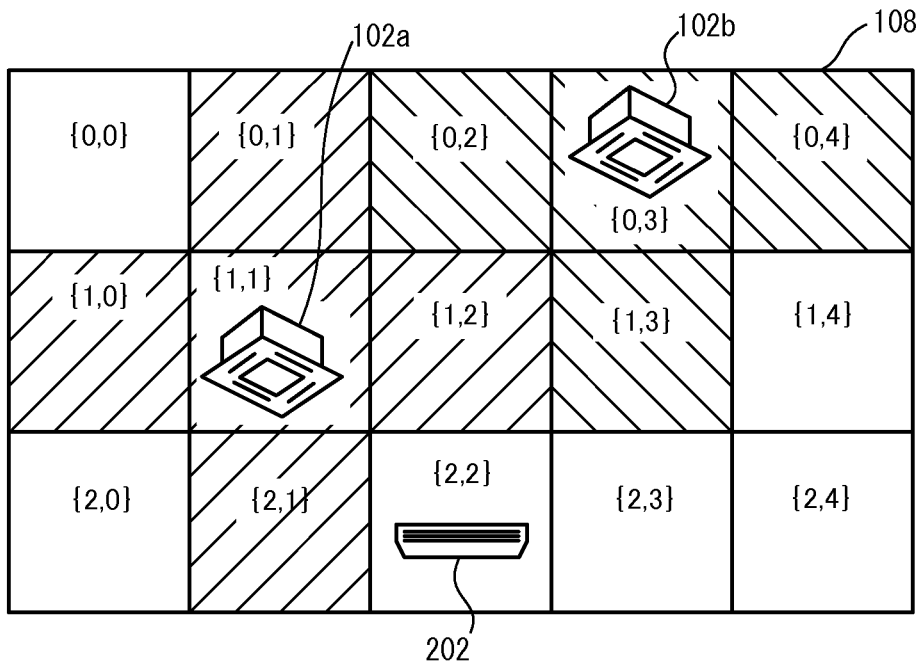
FIG. 17 is a diagram illustrating sections dividing an air-conditioned space according to Embodiment 2, and the installation positions and affected sections of air conditioners associated with the sections.
FIG. 18 is a diagram illustrating arrangement data according to Embodiment 2.

As illustrated in FIG. 16, arrangement data 225 is stored in the arrangement storage 215. As illustrated in FIG. 18, the arrangement data 225 has a structure similar to the arrangement data 125 according to Embodiment 1.

As illustrated in FIG. 17, in the present embodiment, indoor units 102a, 102b, and 202 are installed. For this reason, as illustrated in FIG. 18, the arrangement data 225 includes data about the indoor unit 102a with the equipment address "1", similarly to Embodiment 1. Unlike Embodiment 1, the arrangement data 225 includes data indicating that the controlled equipment 102b with the equipment address "2" is installed in the section "{0, 3}". The arrangement data 225 additionally includes data about the indoor unit 202 with the equipment address "3" installed in the section "{2, 2}" in the installation direction "{−1, 0}".

As illustrated in FIG. 16, operating state data 227 is stored in the operating state storage 217. As illustrated in FIG. 19, the operating state data 227 has a structure similar to the operating state data 127 according to Embodiment 1.

As illustrated in FIG. 19, the operating state data 227 includes, in addition to data similar to Embodiment 1, data indicating that the indoor unit 102b is operating and exerting the "heat" effect on the sections "{0, 2}, {0, 3}, {0, 4}, and {1, 3}". Consequently, in the present embodiment, the indoor unit 102a and the indoor unit 102b are currently operating.

Additionally, in the present embodiment, an indoor unit 202 is taken to be the controlled equipment that receives a control command, and is referred to as the controlled equipment 202.

Referring to FIG. 16, the spread effect/section determiner 230 computes the effects in affected sections that spread over due to airflow produced by the indoor units 102a, 102b, and 202 other than the controlled equipment 202, and the sections other than the affected sections that are affected by the spread (spread sections).

Figure 20:
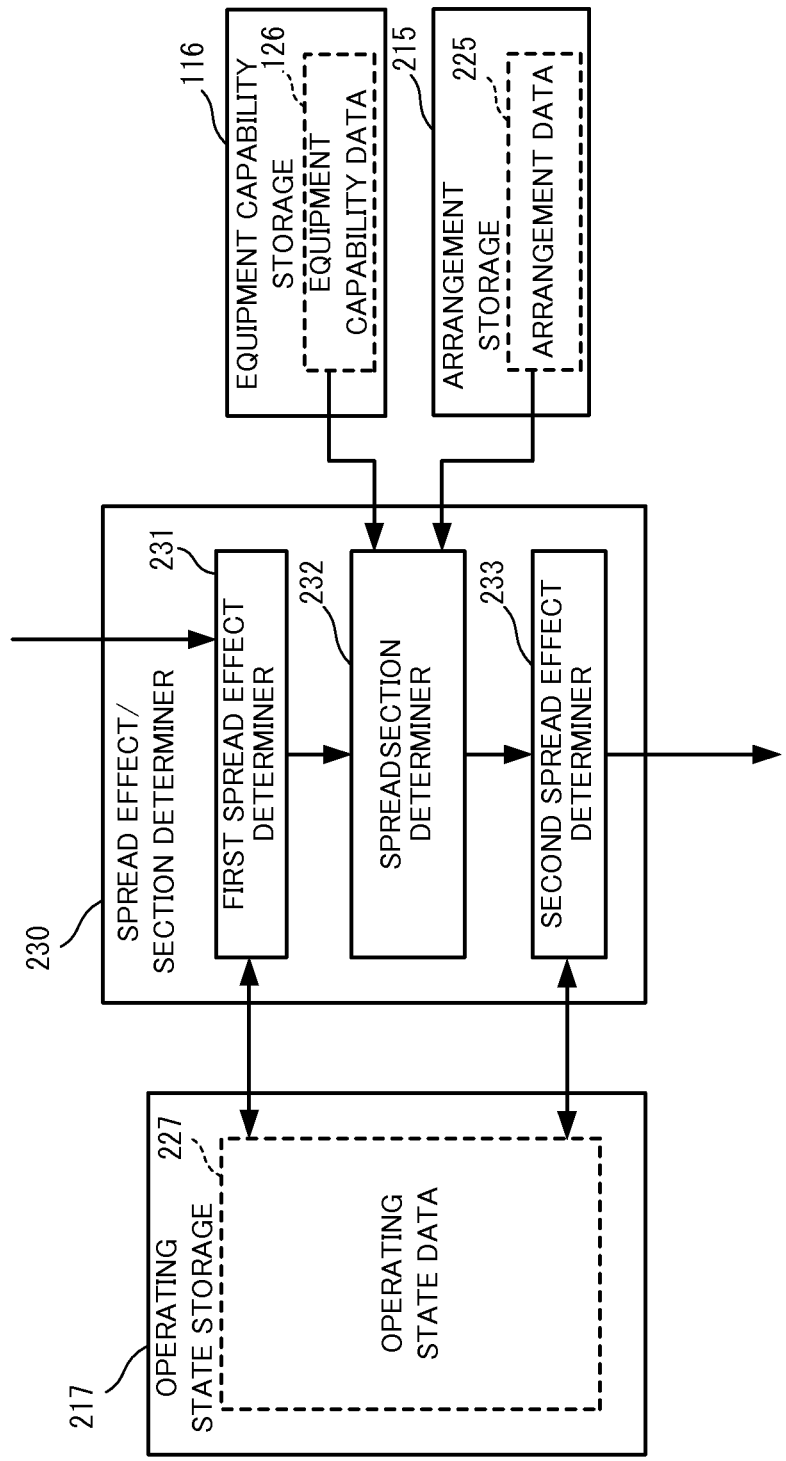
FIG. 20 is a diagram illustrating an example of a function configuration provided with a spread effect/section determiner.

As illustrated in FIG. 20, the spread effect/section determiner 230 is equipped with a first spread effect determiner 231, a spread section determiner 232, and a second spread effect determiner 233.

The first spread effect determiner 231 computes an effect that spreads over (spread effect) in an affected section as a result of the controlled equipment 202 operating when the controlled equipment 202 operates according to a changed control parameter.

In other words, a spread effect refers to the spread of an effect exerted on an affected section by a currently operating indoor unit 102a or 102b other than the controlled equipment 202. Consequently, a spread effect becomes the same as the effect by an indoor unit 102a or 102b other than the controlled equipment 202 that is associated with an affected section in the operating state data 227. Also, a spread effect spreads over in the downstream direction of the airflow produced by the operation of the controlled equipment 202.

The spread section determiner 232 computes the sections (spread sections) affected by the spread of an effect in an affected section due to airflow produced by the operation of an indoor unit 102a or 102b other than the controlled equipment 202 when that indoor unit 102a or 102b is affecting an affected section.

In other words, when the operating state data 227 includes an effect associated with an affected section, the spread section determiner 232 computes the sections reached by the airflow of the relevant indoor unit 102a or 102b by referencing the arrangement data 225 and the equipment capability data 126. Subsequently, the spread section determiner 232 takes the spread sections to be the sections that are downstream from the affected section from among the sections reached by the airflow of the indoor unit 102a or 102b.

The second spread effect determiner 233 computes the effects that spread into a spread section when a spread section is computed by the spread section determiner 232. The effects that spread into a spread section include exerted effects computed by the effect determiner 121, and spread effects computed by the first spread effect determiner 231.

For example, typically, when the controlled equipment 202 is operating in "cooling mode", the exerted effect computed by the effect determiner 121 is "cool". In this case, when an indoor unit 102a or 102b other than the controlled equipment 202 is exerting an effect on the affected sections, the "cool" effect spreads into a spread section due to air blown out by the indoor unit 102a or 102b.

As another example, when the controlled equipment 202 is operating in "ventilation mode" and an indoor unit 102a or 102b other than the controlled equipment 202 is exerting the "cool" effect on the relevant affected sections, a spread effect of "cool" spreads into the affected sections. At this point, the spread effect of "cool" additionally spreads into the spread sections computed by the first spread effect determiner 231.

Referring to FIG. 16, the mismatch detector 223 detects a mismatched state in the affected sections and the spread sections.

Specifically, similarly to the mismatch detector 123 according to Embodiment 1, the mismatch detector 223 references the exerted effect, and the effects of the indoor units 102a and 102b other than the controlled equipment 202 that are associated with the affected sections in the operating state data 227.

The mismatch detector 223 additionally references the spread effect, and the effects of the indoor units 102a and 102b other than the controlled equipment 202 that are associated in the operating state data 227 with the affected sections affected by that spread effect.

The mismatch detector 223 additionally references the effect computed by the second spread effect determiner 233, or in other words the exerted effect that spreads into the spread sections and the spread effect that spreads into the spread sections, and the effects of the indoor units 102a and 102b other than the controlled equipment 202 that are associated in the operating state data 227 with the spread sections.

Subsequently, for each affected section and each spread section, the mismatch detector 223 detects a mismatched state on the basis of the relationship of these referenced effects, according a similar method as the mismatch detector 123 according to Embodiment 1.

The foregoing describes a configuration of an air conditioning system 200 and an air conditioner operation device 204 according to Embodiment 2. The following will describe the operation of the air conditioning system 200 and the air conditioner operation device 204.

Figure 21:
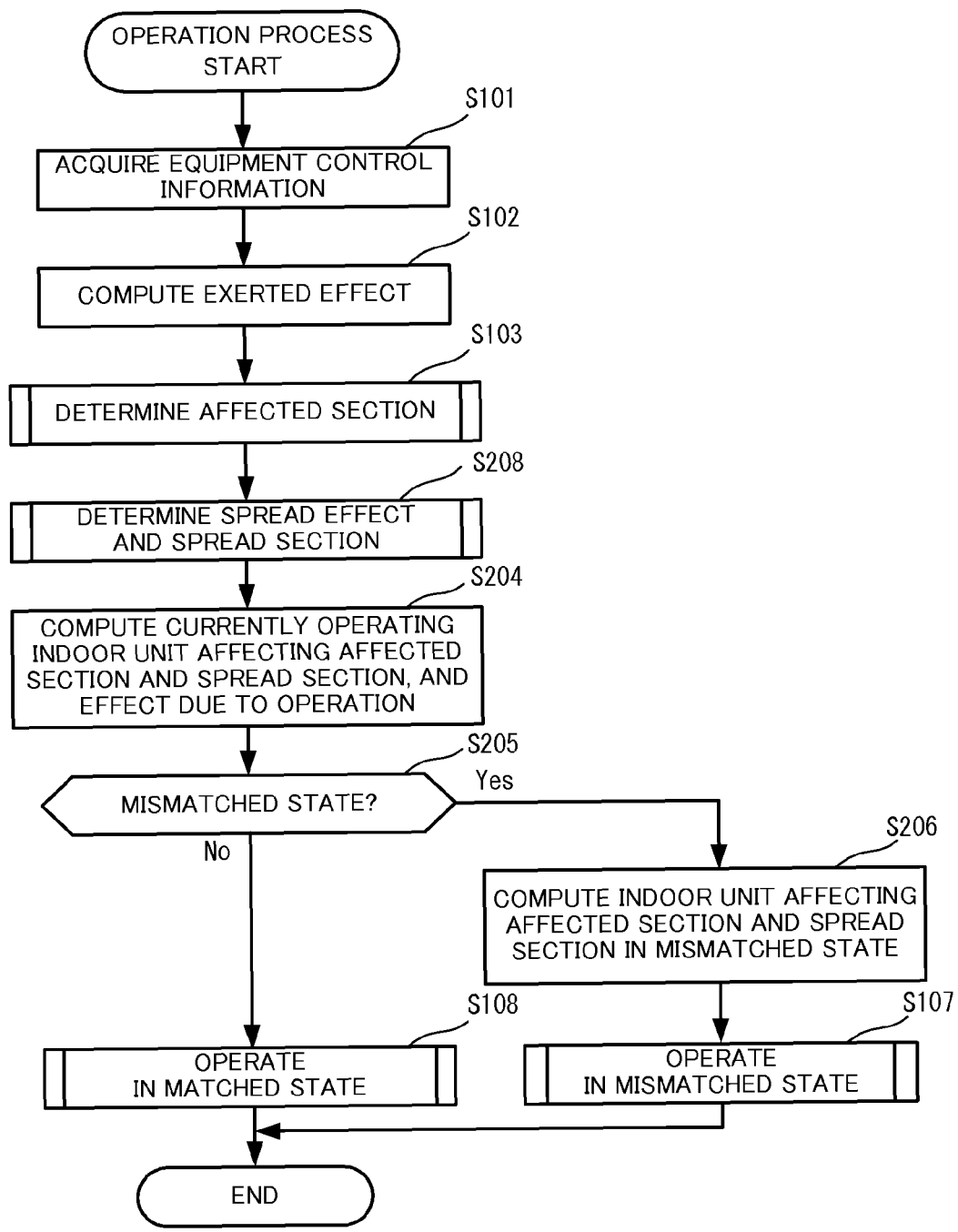
FIG. 21 is a flowchart illustrating a flow of an operation process according to Embodiment 2.

In the present embodiment, suppose that a control command causing the controlled equipment 202 to operate in "ventilation mode" is output, and equipment control information associating the equipment address "3" to that control command is sent from the controlled equipment 202. If the equipment control information is sent from the controlled equipment 202 while the air conditioner operation device 204 is operating, the air conditioner operation device 204 executes processing from step S101 to step S103 similar to Embodiment 1, as illustrated in FIG. 21.

In the present embodiment, the equipment control information acquirer 120 acquires, from the controlled equipment 202, equipment control information that includes the equipment address "3" and an indication of operating in "ventilation mode". Consequently, the effect determiner 121 computes "ventilate" as the exerted effect (step S102).

Referencing the arrangement data 225 illustrated in FIG. 18, "1-way blow-out indoor unit" is associated as the "equipment type" with the equipment address "3". In addition, referencing the equipment capability data 126 illustrated in FIG. 5, "{{1, 0}, 2}" is associated as the "capability" with the "equipment type" of "1-way blow-out indoor unit". In addition, referencing the arrangement data 225 illustrated in FIG. 18, "{2, 2}" is associated as the "installation direction" with the equipment address "3" (step S111).

For this reason, the affected section determiner 122 rotates the blow-out direction of {1, 0} included in the "capability", and computes {0, −1} as the blow-out direction (step S112).

Referencing the arrangement data 225 illustrated in FIG. 18, "{2, 2}" is associated as the "installation position" with the equipment address "3". Referencing the equipment capability data 126 illustrated in FIG. 5, the "capability" associated with the "equipment type" of "1-way blow-out indoor unit" includes "2" as the airflow area.

For this reason, the affected section determiner 122 computes the installation position {2, 2} of the controlled equipment 202, and the sections {1, 2} and {0, 2} within the range "2" of the blow-out direction, as the affected sections (step S113). The affected sections are computed by respectively adding {0, −1} and {0, −2} to the installation position {2, 2}, for example.

Referring to FIG. 21, the spread effect/section determiner 230 determines the spread effect, the spread sections, and the effects that spread into the spread sections (step S208).

Figure 22:
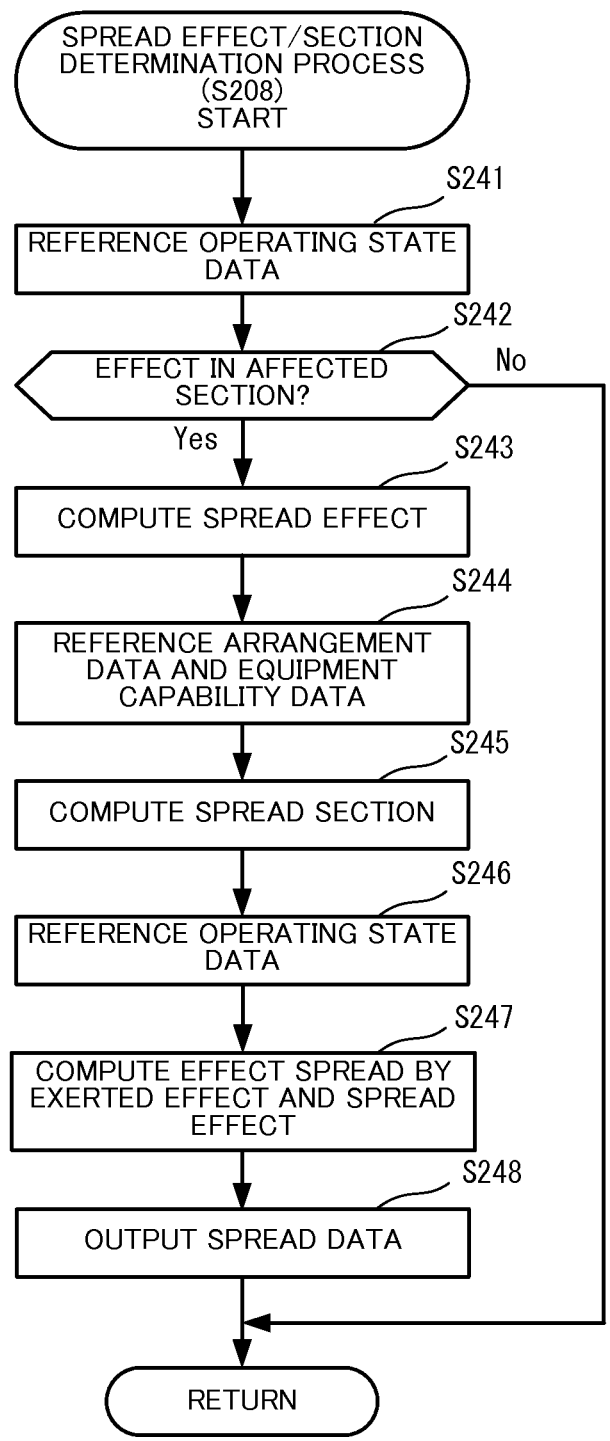
FIG. 22 is a flowchart illustrating a flow of a spread effect/section determination process.

Specifically, as illustrated in FIG. 22, the first spread effect determiner 231 references the operating state data 227 (step S241), and determines whether or not there is an effect associated with an affected section by an indoor unit 102a or 102b other than the controlled equipment 202 (step S242).

At this point, if the controlled equipment 202 is already operating, and relevant operating state data 227 is being stored in the operating state storage 217, that operating state data 227 is excluded from the processing in step S208.

In the case of determining that there are no effects on the affected sections (step S242; No), the first spread effect determiner 231 ends the spread effect/section determination process (step S208).

In the case of determining that there are effects on the affected sections (step S242; Yes), the first spread effect determiner 231 computes the spread effects (step S243).

In the present embodiment, after referencing the equipment addresses and effects associated with the affected sections {2, 2}, {1, 2}, and {0, 2} in the operating state data 227 illustrated in FIG. 19, "{1, cool}" is associated with "{1, 2}", and "{2, heat}" is associated with "{0, 2}". Since spread effects spread downstream in the blow-out direction, the first spread effect determiner 231 computes the spread effect by causing "{1, cool}" in "{1, 2}" to spread into "{0, 2}", as illustrated in FIG. 23.

The spread section determiner 232 references the arrangement data 225 and the equipment capability data 126 (step S244) and executes a process similar to the affected section determination process (step S103), and thereby computes the spread sections (step S245).

In the present embodiment, the airflow produced by the indoor units 102a, 102b, and 202 other than the controlled equipment 202 do not reach sections other than the affected sections. Consequently, there are no spread sections.

The second spread effect determiner 233 references the operating state data 227 (step S246), and computes the exerted effect and the spread effects respectively as effects that spread into the spread sections (step S247).

In the present embodiment, there are no spread sections as discussed above, and thus there are also no effects computed in step S247.

Referring to FIG. 22, the second spread effect determiner 233 generates and outputs spread data to the mismatch detector 223 (step S248).

Specifically, the second spread effect determiner 233 generates spread data that includes the affected sections into which effects spread in step S243, the spread effects computed in step S243, and the equipment addresses of the indoor units 102a and 102b from which the spread effects originate.

Also, the second spread effect determiner 233 generates spread data that includes the spread sections computed in step S245, the effects computed in step S247, and the equipment addresses of the indoor units 102a, 102b, and 202 from which the effects originate.

Thus, the second spread effect determiner 233 ends the spread effect/section determination process (step S208).

Referring to FIG. 21, similarly to Embodiment 1, for each affected section included in the effect data, the mismatch detector 223 references the effect associated with the affected section in the effect data, and the effect exerted on the affected section by a currently operating indoor unit 102a or 102b other than the controlled equipment 202.

In addition, for each affected section included in the spread data, the mismatch detector 223 references the spread effect associated with the affected section in the spread data, and the effect exerted on the affected section by the indoor unit 102a or 102b from which the spread effect originates and a currently operating indoor unit 102a or 102b other than the controlled equipment 202.

Furthermore, for each spread section included in the spread data, the mismatch detector 223 references the effect associated with the spread section in the spread data, and the effect exerted on the spread section by the indoor unit 102a or 102b from which the effect originates and a currently operating indoor unit 102a or 102b other than the controlled equipment 202.

Subsequently, for each affected section and each spread section, the mismatch detector 223 detects a mismatched state on the basis of the relationship of these referenced effects, according a similar method as the mismatch detector 123 according to Embodiment 1 (step S205).

In the case of determining that there is a mismatched state (step S205; Yes), the mismatch detector 223 computes the equipment address of an indoor unit 102a, 102b, or 202 exerting an effect on the affected sections and spread sections in a mismatched state (step S206).

Specifically, the mismatch detector 223 computes the equipment address of the controlled equipment 202. The mismatch detector 223 computes the equipment address of a currently operating indoor unit 102a or 102b other than the controlled equipment 202 from which originates a spread effect being exerted on an affected section in a mismatched state. The mismatch detector 223 computes the equipment address of an indoor unit 102a, 102b, or 202 from which originates an effect being exerted on a spread section in a mismatched state.

In the present embodiment, the mismatch detector 223 computes "3" as the equipment address of the controlled equipment 202. In addition, the mismatch detector 223 computes "1" and "2" as the equipment addresses of currently operating indoor units 102a or 102b other than the controlled equipment 202 from which originate a spread effect being exerted on the affected section {0, 2} in a mismatched state.

Note that in step S247, the second spread effect determiner 233 may also determine only the exerted effect computed by the effect determiner 121 as the effect that spreads into the spread sections, without computing the spread of spread effects. In this case, the indoor unit from which originates the effect that spreads into the spread sections is the controlled equipment 202.

According to the air conditioning system 200 and the air conditioner operation device 204 in accordance with the present embodiment, advantageous effects similar to the air conditioning system 100 and the air conditioner operation device 104 of Embodiment 1 are exhibited.

Furthermore, spread effects, or effects that spread into spread sections, may be referenced to detect a mismatched state in affected sections or spread sections. Consequently, when the indoor units 102a, 102b, and 202 are arranged at a certain density, a mismatched state may be detected accurately, even in cases such as when an indoor unit 102a, 102b, or 202 that acts as an air conditioner is equipment such as a blower that lacks an ability to vary the room temperature by itself.

The foregoing describes some example embodiments of the present disclosure. This detailed description, therefore, is not to be taken in a limiting sense, and the scope of the invention is defined only by the included claims, along with the full range of equivalents to which such claims are entitled.

This application claims priority based on Japanese Patent Application No. 2012-263247 file in the Japan Patent Office on Nov. 30, 2012. The disclosed content of the above patent application is hereby incorporated in full into this application by way of reference.

INDUSTRIAL APPLICABILITY

The present disclosure may be used in a device, system, method, program, and the like for operating facility equipment such as an air conditioner or lighting equipment.

The invention claimed is:

1. A facility equipment operation device comprising:
affected section determiner configured to compute an affected section, the affected section being a section affected by a controlled equipment that is a facility equipment with a changed control parameter, by referencing data including an installation position of facility equipment in an objective space, and a capability related to an area affected by the facility equipment;
mismatch detector configured to detect a mismatched state on the basis of whether or not An effect exerted by the controlled equipment on the affected section when the controlled equipment operates according to the changed control parameter, and an effect exerted on the affected section by a facility equipment currently operating, are in a predetermined relationship;
arrangement storage configured to store arrangement data associating identification information for identifying the facility equipment, equipment type information for identifying a group that the facility equipment belongs to, and an installation position of the facility equipment in the objective space;
equipment capability storage configured to store equipment capability data associating the equipment type information and the capability related to an area affected by the facility equipment belonging to the group indicated by the associated equipment type information;
operating state storage configured to store operating state data associating a section affected by the currently operating facility equipment from among sections dividing the objective space, and an effect exerted on the associated section by the currently operating facility equipment; and
equipment control information acquirer configured to acquire equipment control information including the identification information of controlled equipment, the controlled equipment being the facility equipment with the changed control parameter, and the changed control parameter;
wherein the affected section determiner configured to compute, by referencing the arrangement data and the equipment capability data, the affected section that is a section affected by the controlled equipment;
the mismatch detector configured to detect a mismatched state on the basis of whether or not the effect exerted by the controlled equipment on the affected section when the controlled equipment operates according to the changed control parameter, and an effect associated with the affected section in the operating state data, are in the predetermined relationship; and
send information generator configured to generate and output send information to equipment, including the controlled equipment, that affects the affected section when the mismatch detector detects the mismatched state, the send information controlling operation of the equipment that affects the affected section.

2. The facility equipment operation device according to claim 1, wherein
the mismatch detector configured to detect the mismatched state by determining whether or not the effect exerted by the controlled equipment on the affected section, and the effect exerted by the currently operating facility equipment on the affected section, are in the predetermined relationship as a mutually impeding relationship.

3. The facility equipment operation device according to claim 1, wherein
the mismatch detector configured to detect the mismatched state by determining whether or not the effect exerted by the controlled equipment on the affected section, and the effect exerted by the currently operating facility equipment on the affected section, are a combination predetermined as the mutually impeding relationship.

4. The facility equipment operation device according to claim 1, wherein
the mismatch detector configured to detect the mismatched state by determining whether or not the effect exerted by the controlled equipment on the affected section, and the effect exerted by the currently operating facility equipment on the affected section, are different.

5. The facility equipment operation device according to claim 1, further comprising:
exerted effect determiner configured to compute, by referencing an effect determination rule data associating an effect exerted by the controlled equipment and a determination rule that defines a relationship of the control parameter, an effect associated with the determination rule satisfied by the changed control parameter as the effect exerted by the controlled equipment on the affected section.

6. The facility equipment operation device according to claim 1, wherein:
the facility equipment is a plurality of air conditioners.

7. The facility equipment operation device according to claim 6, further comprising:

first spread effect determiner configured to compute an effect associated with the affected section in an operating state data associating a section affected by the currently operating facility equipment from among sections dividing the objective space, and an effect exerted on the associated section by the currently operating facility equipment, as an effect in an affected section downstream from the affected section, wherein the mismatch detector additionally configured to detect the mismatched state on the basis of a relationship of the effect in the downstream affected section computed by the first spread effect determiner, and an effect associated with the downstream affected section in the operating state data.

8. The facility equipment operation device according to claim 7, wherein the operating state data additionally associates identification information for identifying the currently operating facility equipment, the facility equipment operation device further comprises arrangement storage configured to store arrangement data associating identification information for identifying the facility equipment, equipment type information for identifying a group that the facility equipment belongs to, and an installation position of the facility equipment in the objective space;

equipment capability storage configured to store equipment capability data associating the equipment type information and the capability related to an area affected by the facility equipment belonging to the group indicated by the associated equipment type information;

equipment control information acquirer configured to acquire equipment control information including the identification information of controlled equipment, the controlled equipment being the facility equipment with the changed control parameter, and the changed control parameter;

spread section determiner configured to compute, by referencing the arrangement data and the equipment capability data when the operating state data includes an effect associated with the affected section, a spread section, the spread section being a section downstream from the affected section, from among sections affected by the currently operating facility equipment indicated by the identification information associated in the operating state data with the included effect, and second spread effect determiner configured to determine the effect exerted by the controlled equipment on the affected section, as an effect in the computed spread section, when the spread section is computed by the spread section determiner, wherein the mismatch detector additionally configured to reference the effect computed by the second spread effect determiner in the computed spread and the effect associated with the computed spread section in the operating state data, and detect the mismatched state on the basis of a relationship of the referenced effects.

9. The facility equipment operation device according to claim 8, wherein the facility equipment is the plurality of air conditioners configured to operate in at least one operating mode from among a heating mode maintaining a temperature of a space within a predetermined range based on a set temperature by heating air taken in and then blowing out the heated-up air, a cooling mode maintaining a temperature of a space within a predetermined range based on a set temperature by cooling air taken in and then blowing out the cooled-down air, and a ventilation mode circulating air downstream by blowing out air taken in, the equipment control information includes at least one of the operating mode, the set temperature, and a current temperature of the affected section as the control parameter, and the effect includes at least one of heat, cool, and ventilate, corresponding to operation in the heating mode, operation in the cooling mode, and operation in the ventilation mode, respectively.

10. The facility equipment operation device according to claim 1, wherein the mismatch detector configured to store the operating state data associating the affected section and the effect exerted by the controlled equipment on the affected section into the operating state storage when the mismatched state is not detected.

11. The facility equipment operation device according to claim 1, wherein the arrangement data additionally associates an installation direction, the installation direction being a direction faced in the objective space by a reference direction configured in the facility equipment, and the capability related to the area affected by the facility equipment includes a direction of air blown out by the facility equipment with respect to the reference direction, and a reach of the blown-out air from the facility equipment.

12. A facility equipment operation system comprising:

the facility equipment operation device according to claim 1; and the facility equipment connected to the facility equipment operation device via a communication line.

13. The facility equipment operation system according to claim 12, wherein the facility equipment operation device further comprises equipment control information generator configured to, when the mismatched state is detected by the mismatch detector, discard the equipment control information acquired by the equipment control information acquirer, and also generate equipment control information for stopping operation of the facility equipment exerting an effect on a section where the mismatched state is detected, and first sender configured to send the equipment control information generated by the equipment control information generator to the facility equipment, and the facility equipment configured to receive the equipment control information from the first sender, and to stop operation in response to the received equipment control information if the facility equipment itself is facility equipment exerting an effect on a section detected to be in the mismatched state.

14. The facility equipment operation system according to claim 12, wherein the facility equipment operation device further comprises warning information generator configured to generate warning information indicating detection of the mismatched state when the mismatched state is detected by the mismatch detector, and second sender configured to send warning information generated by the warning information generator to the facility equipment, and the facility equipment receives the warning information from the second sender, and displays a detection of the mismatched state in response to the warning information if the facility equipment itself is facility equipment exerting an effect on a section detected to be in the mismatched state.

15. The facility equipment operation system according to claim 12, wherein the facility equipment operation device further comprises third sender configured to send equipment control information acquired by the equipment control information acquirer if the mismatched state is not detected by the mismatch detector, and the facility equipment receives the equipment control information from the third sender, and changes operation according to the received equipment control information if the facility equipment itself is the controlled equipment.

\* \* \* \* \*